May 25, 1965 A. P. WILLIAMS ETAL 3,185,820
INTEGRATOR AND RECORDER APPARATUS
Filed Feb. 12, 1962

Alvie P. Williams
Hal J. Jones
Clinton D. Frisby
Francis J. Niven, Jr.
INVENTORS BY Hayden & Prawel

ATTORNEYS 3,185,820
INTEGRATOR AND RECORDER APPARATUS
Alvie P. Williams, Hal J. Jones, Clinton D. Frisby, and Francis J. Niven, Jr., all of Houston, Tex., assignors to Infotronics Corp., Houston, Tex., a corporation of Texas
Filed Feb. 12, 1962, Ser. No. 172,425
8 Claims. (Cl. 235—92)

This invention relates to new and useful improvements in integrator apparatus, and particularly an integrator apparatus having recorder means therewith.

Chromatograph detectors are presently employed for examining materials both quantitatively and qualitatively. The detector produces a varying amplitude wave in the presence of different materials, the area under the wave being a quantitive measurement of each particular constituent in the material and the time at which the peaks in the wave occur indicating the chemical nature of each constituent, as is well known. Heretofore, efforts have been made to integrate the area under the curve, but such prior efforts have been inaccurate and difficult to interpret without substantial experience in the interpretation technique.

It is an object of this invention to provide a new and improved apparatus for electronically integrating areas under various curves or waves produced by a chromatograph detector or other source of variable current or voltage so as to obtain a more accurate integration of such areas than heretofore obtained.

An important object of this invention is to provide a new and improved apparatus for determining and recording the peak amplitudes of variable current or voltage waves, while at the same time also determining and recording the area under such variable waves.

Another object of this invention is to provide a new and improved electronic apparatus in which a variable current or voltage from a chromatograph detector or other signal source is fed into an integrator for converting voltage or current amplitude variations to pulses at frequencies which vary in response to said amplitude variations, and wherein such amplitude variations are also fed into a slope detector which continuously detects the direction of slope of the amplitude waves so as to determine whether the signal rate of change is zero, increasing or decreasing, thereby making it possible to obtain an indication of the peak, as well as the points of starting and stopping integration, for each wave variation.

A further object of this invention is to provide a new and improved integrator apparatus having means therewith for recording the time at which each peak in the signal output occurs.

A particular object of this invention is to provide a new and improved apparatus for recording on a printed tape, punched IBM cards, magnetic tape or similar record means, the numerical value of the integral of a signal from a chromatograph detector or other source, and also the times at which integration starts and stops, and the times at which the wave peaks occur with respect to the beginning of such signal.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein.

Briefly, the apparatus of this invention is adapted to receive output signals from a chromatograph detector 10 or any other suitable source of variable current or voltage and produce a record showing the integrated area under the voltage or current wave or curve as well as the times at which the peaks of the wave or curve are reached. Such a record of the integrated area and the peak times for an output signal from a chromatograph detector is particularly desirable because such information indicates the chemical constituents, and the quantities thereof, in a particular composition or material.

Figure 1:
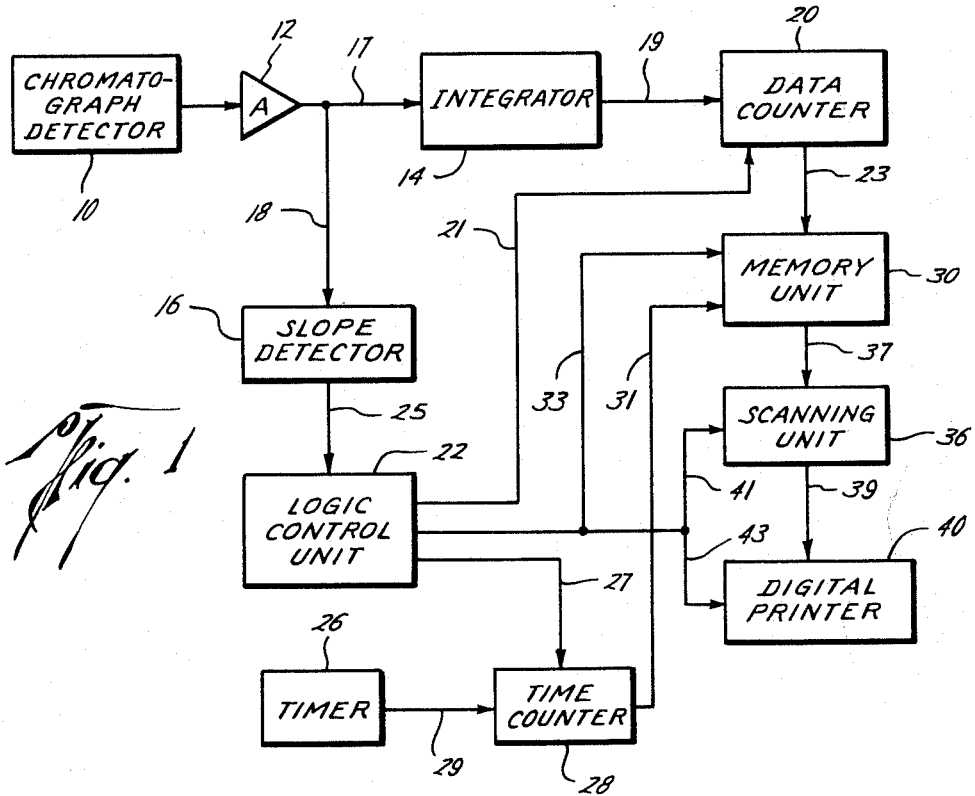
FIG. 1 is a block diagram of the electrical components of the present invention.

Considering the invention more in detail, and referring in particular to FIG. 1 of the drawings, the various electrical units or components of the present apparatus are shown in block form since each is a known type of electrical unit. The output signals from the chromatograph detector 10 are preferably amplified through a preamplifier 12 to be compatible with the input of a solid state voltage-to-frequency converter or integrator 14. The use of the preamplifier is to extend the practical operating range of the apparatus to lower voltages such as a five millivolt full scale, one millivolt full scale, or even fractional millivolt full scale. Such full scale ranges are given merely by way of example to indicate the use of the preamplifier 12. The preamplifier is not necessary and may be omitted if it is desired to have only the normal fifty millivolt full scale sensitivity of the integrator 14.

The signal output from the detector 10 which may be a Beckman Instrument Corp. chromatograph designated as model GC-1 or GC-2, or other source of variable current or voltage, becomes the input to the apparatus of this invention as it is fed either through the amplifier 12 or directly to the integrator 14. Actually, the input waveform is fed in parallel to the integrator 14 and a slope detector 16 through electrical lines 17 and 18, respectively.

The integrator 14 is preferably a solid state voltage-to-frequency converter such as model 211 or 240, manufactured by the Vidar Company, although other means may be employed for accomplishing the change of the input voltage into a train of pulses, the frequency of which is precisely proportional to the amplitude of the input voltage. This is preferably accomplished with the solid state devices or transistors in the usual way. Each pulse from the integrator 14 which flows through suitable electrical lines 19 represents an incremental number of microvolt-seconds at the detector output. The pulses fed from the integrator 14 through the lines 19 ultimately reach a gated electronic data counter 20, the operation of which is controlled through the slope detector 16 and a logic control unit 22, as will be more fully explained. The counter 20 is preferably a six digit electronic totalizing counter of any conventional type, one such counter being manufactured by the Computer Measurements Corp. and known as model 1314. The total data accumulated on the counter during a given time interval is directly proportional to the time integral of the signal from the detector 10 or other source. The term "time integral" as used herein means the area under the curve or waveform for a particular span of time. It is to be noted that the data counter 20 may be a nine decade counter, with six of the digits being used for the counting of the pulses from the integrator and with three of the digits being used for indicating the time at the peak or high point of each wave in a particular waveform or curve, as will be more fully explained.

The slope detector 16 is a device for electronically differentiating so as to determine the rate of change of a particular curve or waveform. One such electronic differentiating device may be fabricated of one capacitor and one resistor. The combination of one capacitor and one resistor, or any other differentiating circuit for that matter, may be made more elaborate by including a switch for altering the electrical values of the components to vary the operative range of the differentiating circuit and may additionally include a postamplifier and a preamplifier or some impedance matching device. Such differentiating devices include a pair of magnetic amplifiers connected in the known manner for indicating such rates of change in the waveform. Thus, the slope detector examines the input waveform to determine whether the signal rate of change is zero, increasing, or decreasing. Such information is fed into the logic control unit 22 which is constructed in a conventional way with a plurality of relays of conventional construction. Preferably, in the present control unit 22, there are eighteen mercury wetted plug-in relays. The slope detector 16 and the logic control unit 22 are connected by electrical leads or wires generally indicated by the line 25. The slope detector 16 provides a signal indicating the presence or absence of a peak in the wave form supplied from the detector 10 and the logic control unit 22 responds by starting the data counter 20 and causing a memory unit to be described to receive data from the data counter 20. This operation is initiated at the onset of a peak and the termination of the peak causes the memory unit to be scanned by means to be described whereupon the data therein is provided for output.

The apparatus includes a timer 26 which is preferably a synchronous motor timer which provides pulses at a rate of one per second. The timer 26 is connected to a time counter 28 through suitable lines or wires 29. The time counter 28 is actually a part of the data counter 20 in actual practice and it is provided with the three digits heretofore mentioned. However, the time counter is basically separate from the data counter and is therefore illustrated as a separate unit. The time counter 28 is therefore a three digit electronic totalizing counter which accumulates the pulses from the timer 26 and, periodically transmits such time count to a memory unit 30 through the connecting wires or lines 31. The times at which the counter 28 feeds its count to the memory unit 30 is controlled by the logic control unit 22 which is connected to the counter 28 by wires 27. As previously noted, the logic control unit is preferably composed of a plurality of relays, but it will be recognized by those skilled in the art that such logic control unit could use transistors or any other suitable switching circuit for such logic control.

The logic control unit 22 is also electrically connected with the memory unit 30 through electrical wires designated by the line 33. The memory unit 30 is a conventional electronic unit composed of a thyratron buffer memory bank of nine decades of binary-coded-decimal memory. The memory unit 30 is utilized in the apparatus of this invention rather than having a direct print-out or other record made from the data counter 20 and the time counter 28 because the counters 20 and 28 operate electronically at a much higher rate of speed than the usual printing equipment. Each decade of the memory unit 30 may be comprised of four off-on switching devices such as the aforementioned thyratrons or flip-flops which are actuated by the binary-coded-decimal symbol indicated by the data counter 20 to store the value of the integer in the conductive condition of the thyratrons until such time as the printer can accept it and provide a printed tape or other read-out. Additional decades having four similar circuit elements may be connected to the data counter 20 to provide the total of nine decades of binary-coded-decimal memory storage for storing the numerical data of the data counter 20 and the time counter 28. The manner of connecting such circuitry is within the purview of those skilled in the art. Therefore, the memory unit 30 stores the information until such time as the printer can accept it and provide a printed tape or other read-out.

The memory unit 30 is electrically connected to a scanning unit 36 through electrical wires indicated by the line 37 in FIG. 1. The scanning unit is a multi-bank stepping switch of conventional construction which scans the thyratron tubes of the memory unit 30 digit by digit. One such stepping switch might include nine levels of contacts having four contacts at each level with the contacts electrically connected to output terminals of the thyratrons of the memory unit 30 as a means of electrically ascertaining the conductive state of the thyratrons. The stepping switch provides binary-coded-decimal output signals which are used directly in some types of recording or indicating equipment and such signals may be provided by direct connection to the wiper arms of the stepping switch. Other types of numerical indicating apparatus utilize decimal indications so that the unit 36 may include suitable relays or other electronic equipment for converting the binary-coded-decimal output to a numerical output which is in the form of numbers to the base 10. As an example of such circuitry, four relays having ten sets of contacts each might be connected to the four outputs associated with each decade provided by the wiper arms of the stepping switch with the contacts of the four relays connected so as to provide ten output signals with the interconnections arranged to decode the binary representation supplied by the stepping switch by binary addition on actuation of the relays. Such stepping switches produce a binary-coded-decimal output which may be used directly if the record from the data counter and the time counter is to be produced on a punched IBM tape or card. However, when the record is to be printed on a computer tape, the scanning unit 36 includes the above-mentioned suitable relays or other electronic put to a numerical output which is fed through electrical equipment for converting the binary-coded-decimal output wires indicated by the line 39 to the digital printer 40. Such printer 40 is a standard computer or adding machine having the usual ten keys, each of which is operated by a solenoid. It is to be noted that the logic control unit 22 is electrically connected to the scanning unit 36 by electrical wires indicated by the line 41 and also to the digital printer 40 by electrical wires indicated by the line 43.

Figure 2:
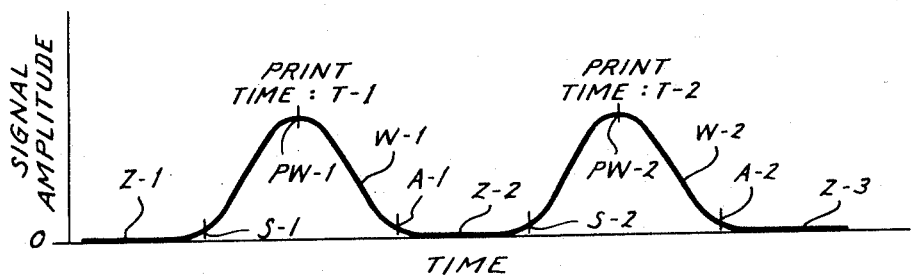
FIG. 2 is a graph indicating the type of wave or curve which is integrated with the present invention.

In the operation of the apparatus of this invention, the output signal from the detector 10, which becomes the input to the present apparatus, may have a form similar to that shown in FIG. 2. As shown in FIG. 2, the signal output or curve has a plurality of waves W-1 and W-2, the amplitude and form of which may vary. Between the waves there may be zero portions, such as indicated at Z-1, Z-2 and Z-3. Each of the waves has a peak or upper point of amplitude indicated for waves W-1 and W-2 as PW-1 and PW-2, respectively.

As the waveform from the detector 10 or other source is fed through the preamplifier 12, if used, to the integrator 14 and the slope detector 16, the variations in amplitude of the waveform are converted into pulses at the integrator 14. As previously explained, the frequency of such pulses increases and decreases as the amplitude of the waves increases and decreases. Such varying frequency pulses are fed through the line 19 to the data counter 20 and are counted so long as the counter 20 has been actuated by the logic control unit 22. The logic control unit 22 starts the data counter 20 in operation when the slope detector 16 determines that the slope of the curve or waveform is changing from zero to an increasing slope or rate. Thus, at the point S-1 of wave W-1, the slope detector indicates an increasing rate of change or slope which causes the logic control unit 22 to actuate the data counter 20 through the line 21. The frequency pulses coming from the integrator 19 are thus counted, beginning with the change in slope indicated at S-1 of FIG. 2.

When the rate of change of the curve or waveform received from the detector 10 or other source goes from zero to a negative or decreasing rate, which occurs at the crest or peak PW-1 for the wave W-1, the slope detector 16 signals the logic control unit 22 and the time count in seconds which has elapsed from the start of a particular run or signal is transmitted from the time counter 28 into a section of the memory unit 30.

When the rate of change of the input signal goes from a decreasing value or a negative value to zero such as indicated at A-1 and A-2 for the waves W-1 and W-2, respectively, such change is detected by the slope detector 16 and the signal is fed to the logic control unit 22 for stopping the data counter 20 and for causing the memory unit 30 to immediately receive the data from the data counter 20. The data counter 20 is then reset and the integrator 14 is then free to begin the integration of the next signal peak or wave W-2 at the point S-2. Such cycle of operations is repeated for each of the peaks or waves of the particular signal received by the apparatus of this invention from any signal output such as the detector 10.

The scanning unit 36 scans the memory unit 30 and transfers the data and the time count for each wave or peak to the digital printer 40 as rapidly as the printer will function. The time T-1 and the integration area which is counted at A-1 for the first peak or wave W-1 is printed on one line of the printer tape from the digital printer 40. The first six digits on the line represent the area under the curve or wave W-1 whereas the last three digits indicate the time of the peak or crest PW-1. The same information is printed on separate lines for each of the waves or peaks such as W-2 and others not shown.

After the scanning unit has transferred its information to the digital printer, the memory unit is reset for the next time count and data. Suitable means for interlocking the complete system are provided, as will be understood by those skilled in the art so that the system must go through the above operation in the proper sequence.

Preferably, the read-out on a printed tape is made on a computer which has a total addition button which is manually depressed after the complete sample run from the chromatograph detector has been made, thereby giving a record of the total integrated area.

As previously pointed out, the digital printer may be omitted and instead, the information as to the area under each particular peak or wave, as well as the peak time count may be read-out on punched IBM cards, tape, or recorded on magnetic tape. Such recording means are of course well known.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. An apparatus for determining the peak amplitudes of variable voltage or current waves and for also determining the area under such variable waves, comprising
   (a) an integrator adapted to receive an output signal of said waves and convert them into pulses at frequencies which are proportionate to the varying amplitudes of said waves,
   (b) a slope detector also adapted to receive said output signal and to determine whether the rate of change of the signal is zero, increasing or decreasing
   (c) an electronic counter connected to said integrator for counting the pulses received therefrom, and
   (d) a logic control unit connected to said slope detector and said counter and operable by said slope detector for controlling the operation of the counter to thereby control the counting of the frequency pulses from the integrator.

2. An apparatus for determining the peak amplitudes of variable voltage or current waves and for also determining the area under such variable waves, comprising
   (a) an integrator adapted to receive an output signal of said waves and convert them into pulses at frequencies which are proportionate to the varying amplitudes of said waves,
   (b) a slope detector also adapted to receive said output signal and to determine whether the rate of change of the signal is zero, increasing or decreasing
   (c) an electronic counter connected to said integrator for counting the pulses received therefrom, and
   (d) a logic control unit connected to said slope detector and said counter,
   (e) said control unit including means for initiating the counter when the slope detector determines that the signal is increasing from zero and for stopping the counter when the slope detector determines that the signal has decreased to zero again.

3. An apparatus for determining the peak amplitudes of variable voltage or current waves and for also determining the area under such variable waves, comprising
   (a) an integrator adapted to receive an output signal of said waves and convert them into pulses at frequencies which are proportionate to the varying amplitudes of said waves,
   (b) a slope detector also adapted to receive said output signal and to determine whether the rate of change of the signal is zero, increasing or decreasing
   (c) an electronic counter connected to said integrator for counting the pulses received therefrom,
   (d) a logic control unit connected to said slope detector and said counter and operable by said slope detector for controlling the operation of the counter to thereby control the counting of the frequency pulses from the integrator,
   (e) a timer, and
   (f) a timer counter connected to said timer and said logic control unit for providing an indication of the time at which the peaks in the waves occur.

4. An apparatus for determining the peak amplitudes of variable voltage or current waves and for also determining the area under such variable waves, comprising
   (a) an integrator adapted to receive an output signal of said waves and convert them into pulses at frequencies which are proportionate to the varying amplitudes of said waves,
   (b) a slope detector also adapted to receive said output signal and to determine whether the rate of change of the signal is zero, increasing or decreasing
   (c) an electronic counter connected to said integrator for counting the pulses received therefrom,
   (d) a logic control unit connected to said slope detector and said counter and operable by said slope detector for controlling the operation of the counter to thereby control the counting of the frequency pulses from the integrator,
   (e) an electronic memory unit connected to said counter for receiving data counted thereon at intervals, and
   (f) said logic control unit having connection with said memory unit for operating same upon the completion of an integration and count of the area under each of said waves to thereby store said count in said memory unit for subsequent use.

5. An apparatus for determining the peak amplitudes of variable voltage or current waves and for also determining the area under such variable waves, comprising
   (a) an integrator adapted to receive an output signal of said waves and convert them into pulses at frequencies which are proportionate to the varying amplitudes of said waves,
   (b) a slope detector also adapted to receive said output signal and to determine whether the rate of change of the signal is zero, increasing or decreasing (c) an electronic counter connected to said integrator for counting the pulses received therefrom, (d) a logic control unit connected to said slope detector and said counter and operable by said slope detector for controlling the operation of the counter to thereby control the counting of the frequency pulses from the integrator, (e) an electronic memory unit connected to said counter for receiving data counted thereon at intervals, (f) said logic control unit having connection with said memory unit for operating same upon the completion of an integration and count of the area under each of said waves to thereby store said count in said memory unit for subsequent use, (g) a scanning unit connected to said memory unit for serially transferring the data from said memory unit, and (h) a digital printer adapted to receive and print the data from each of said waves on one line.

6. An apparatus for determining the peak amplitudes of variable voltage or current waves and for also determining the area under such variable waves, comprising (a) an integrator adapted to receive an output signal of said waves and convert them into pulses at frequencies which are proportionate to the varying amplitudes of said waves, (b) a slope detector also adapted to receive said output signal and to determine whether the rate of change of the signal is zero, increasing or decreasing (c) an electronic counter connected to said integrator for counting the pulses received therefrom, (d) a logic control unit connected to said slope detector and said counter and operable by said slope detector for controlling the operation of the counter to thereby control the counting of the frequency pulses from the integrator, (e) an electronic memory unit connected to said counter for receiving data counted thereon at intervals, (f) said logic control unit having connection with said memory unit for operating same upon the completion of an integration and count of the area under each of said waves to thereby store said count in said memory unit for subsequent use, (g) a timer, (h) a timer counter connected to said timer and said logic control unit for providing an indication of the time at which the peaks in the waves occur, and (i) said timer counter having connection with said memory unit for storing said peak times for subsequent use.

7. An apparatus for determining the peak amplitudes of variable voltage or current waves and for also determining the area under such variable waves, comprising (a) an integrator adapted to receive an output signal of said waves and convert them into pulses at frequencies which are proportionate to the varying amplitudes of said waves, (b) a slope detector also adapted to receive said output signal and to determine whether the rate of change of the signal is zero, increasing or decreasing (c) an electronic counter connected to said integrator for counting the pulses received therefrom, (d) a logic control unit connected to said slope detector and said counter and operable by said slope detector for controlling the operation of the counter to thereby control the counting of the frequency pulses from the integrator, (e) an electronic memory unit connected to said counter for receiving data counted thereon at intervals, (f) said logic control unit having connection with said memory unit for operating same upon the completion of an integration and count of the area under each of said waves to thereby store said count in said memory unit for subsequent use, (g) a timer, (h) a timer counter connected to said timer and said logic control unit for providing an indication of the time at which the peaks in the waves occur, (i) said timer counter having connection with said memory unit for storing said peak times for subsequent use, (j) a scanning unit connected to said memory unit for serially transferring the data from said memory unit, and (k) a digital printer adapted to receive and print the data and peak time from each of said waves on one line.

8. An apparatus for determining information relative to a variable voltage or current wave, comprising:

(a) an integrator connected to receive an output signal of such waves and convert same into pulses at frequencies which are proportionate to the varying amplitudes of said waves as an indication of said amplitudes, (b) means connected to receive the output signal of such waves for determining the presence or absence of a peak in said waves, and (c) means connecting said peak detector with said integrator to thereby relate the flow of said pulses to the occurrence of peaks in said waves.

References Cited by the Examiner
UNITED STATES PATENTS

| | | | |
|---|---|---|---|
| 2,774,535 | 12/56 | Anderson | 324—103 |
| 2,833,469 | 5/58 | Groth | 235—92 |
| 2,835,868 | 5/58 | Lindesmith | 324—111 |
| 2,845,597 | 7/58 | Perkins | 324—103 |
| 3,038,078 | 6/62 | Kern | 250—106 |

MALCOLM A. MORRISON, *Primary Examiner.*